United States Patent
Muramatsu et al.

(10) Patent No.: US 8,974,958 B2
(45) Date of Patent: Mar. 10, 2015

(54) ELECTRODE FOR NONAQUEOUS ELECTROLYTE SECONDARY BATTERY, NONAQUEOUS ELECTROLYTE SECONDARY BATTERY, AND BINDER FOR ELECTRODE

(71) Applicant: Kabushiki Kaisha Toshiba, Minato-ku, Tokyo (JP)

(72) Inventors: Miho Muramatsu, Kanagawa (JP); Tomokazu Morita, Chiba (JP); Takashi Kuboki, Tokyo (JP); Norio Takami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/785,455

(22) Filed: Mar. 5, 2013

(65) Prior Publication Data
US 2013/0244103 A1    Sep. 19, 2013

(30) Foreign Application Priority Data
Mar. 19, 2012   (JP) .................................. 2012-062432

(51) Int. Cl.
*H01M 4/62*    (2006.01)
*H01M 4/13*    (2010.01)

(52) U.S. Cl.
CPC ............. *H01M 4/622* (2013.01); *H01M 4/13* (2013.01)
USPC ......................................... 429/211; 524/300

(58) Field of Classification Search
None
See application file for complete search history.

(56) References Cited

U.S. PATENT DOCUMENTS

| 6,171,723 | B1 | 1/2001 | Loch et al. |
| 7,214,445 | B2 * | 5/2007 | Miyaki ..................... 429/218.1 |
| 2010/0285368 | A1 * | 11/2010 | Yamamoto et al. ...... 429/231.95 |

FOREIGN PATENT DOCUMENTS

| JP | 05-074461 | 3/1993 |
| JP | 2001-520443 | 10/2001 |
| JP | 2008-204829 | 9/2008 |
| JP | 2009-110883 | 5/2009 |
| JP | 2010-189632 | 9/2010 |
| JP | 2011-113923 | 6/2011 |

OTHER PUBLICATIONS http://www.chemspider.com/Chemical-Structure.3951.html.*
http://pubchem.ncbi.nlm.nih.gov/summary/summary.cgi?cid=445639.*
U.S. Appl. No. 13/599,288, filed Aug. 2012, Kitaguchi et al.*
Office Action of Notification of Reason(s) for Refusal for Japanese Patent Application No. 2012-062432 Dated Jun. 24, 2014, 5 pgs.

* cited by examiner

*Primary Examiner* — Patrick Ryan
*Assistant Examiner* — Christopher Domone
(74) *Attorney, Agent, or Firm* — Amin, Turocy & Watson, LLP

(57) ABSTRACT

An electrode for a nonaqueous electrolyte secondary battery of an embodiment includes: a current collector; and an active material layer including an active material and a binder, formed on the current collector, wherein the binder includes at least an olefin based polymer and a fatty acid, and the fatty acid has a melting point of 25° C. or less and a boiling point of 100° C. or more.

13 Claims, 2 Drawing Sheets

ELECTRODE FOR NONAQUEOUS ELECTROLYTE SECONDARY BATTERY, NONAQUEOUS ELECTROLYTE SECONDARY BATTERY, AND BINDER FOR ELECTRODE

CROSS-REFERENCE TO RELATED APPLICATION

This application is based upon and claims the benefit of priority from Japanese Patent Applications No. 2012-062432, filed on Mar. 19, 2012; the entire contents of which are incorporated herein by reference.

FIELD

Embodiments described herein relate generally to an electrode for a nonaqueous electrolyte secondary battery, a nonaqueous electrolyte secondary battery, and a binder for an electrode.

BACKGROUND

In recent years, mobile electronic devices have rapidly been spreading, and along with the progress in performance of these devices, lithium ion secondary batteries used therein have been required to have higher output and higher energy density. Moreover, the development into environmental protection energy and alternative energy to oil for electric vehicles (EV) has also been expected recently, and for example, an alkali secondary battery (Ni—MH battery) and a nonaqueous electrolyte secondary battery including a lithium compound (lithium ion battery) have been put into practical use.

A positive electrode and a negative electrode of a secondary battery such as a Ni—MH battery or a lithium ion battery are fabricated by binding each active material for the positive electrode and the negative electrode to a current collector with a binder material. In the example of the lithium ion battery, at first, a solution in which polyvinylidene fluoride (PVdF) is dissolved in N-methyl-2-pyrrolidone (NMP) or an aqueous dispersion liquid of polytetrafluoroethylene (PTFE) was used as the binder material for each of the positive electrode and the negative electrode. However, since PVdF has a low binding force, it was necessary to use a large amount of PVdF for the active material and the capacity per unit volume was low. Moreover, PVdF is easily decomposed by dehydrofluorination reduction in a reducing atmosphere, and the generated hydrogen fluoride might cause the deterioration of the active material.

Therefore, the use of an aqueous dispersion base styrene butadiene latex binder material (aqueous dispersion based SBR) with a stronger binding property has recently become the mainstream. However, this aqueous dispersion based SBR cannot be used in the positive electrode where oxidation reaction occurs, because a double bond of butadiene causes oxidative degradation.

Therefore, as a binder material that can be also used for the positive electrode, an olefin based polymer binder that is electrochemically stable and has a low swelling property with respect to an electrolytic solution has been proposed.

DETAILED DESCRIPTION

An electrode for a nonaqueous electrolyte secondary battery of an embodiment includes: a current collector; and an active material layer including an active material and a binder, formed on the current collector, wherein the binder includes at least an olefin based polymer and a fatty acid, and the fatty acid has a melting point of 25° C. or less and a boiling point of 100° C. or more.

A nonaqueous electrolyte secondary battery of an embodiment using an electrode for a nonaqueous electrolyte secondary battery includes: a current collector; and an active material layer including an active material and a binder, formed on the current collector, wherein the binder includes at least an olefin based polymer and a fatty acid, and the fatty acid has a melting point of 25° C. or less and a boiling point of 100° C. or more.

A binder for an electrode of an embodiment includes: an olefin based polymer; and a fatty acid, wherein the fatty acid has a melting point of 25° C. or less and a boiling point of 100° C. or more.

Embodiments of the invention will be described below with reference to the drawings.

Since a polyolefin based polymer binder material is difficult to be dissolved into the both aqueous solvent and organic solvent, just a method in which the binder material is used in emulsion has been proposed. For dispersing the binder material uniformly into the solution, an additive such as a dispersing agent or an emulsifier is necessary. Further, at the manufacture of an electrode, appropriate viscosity is necessary for applying paste, which has been kneaded and mixed and prepared with an active material or a conductive agent, on a metal current collector; therefore, addition of a viscosity-adjusting agent such as water-soluble polymer is necessary. Moreover, at the time of drying the solvent after the application, migration of moving the binder material particle in a direction opposite to the current collector occurs, for example. The addition of these additives and the occurrence of migration have caused the deterioration in battery characteristic.

Figure 1:
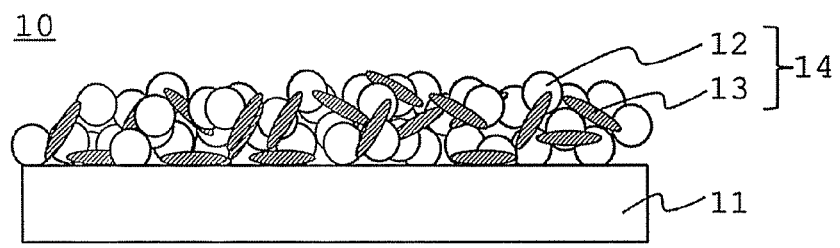
FIG. 1 is a schematic view of an electrode for a nonaqueous electrolyte secondary battery according to an embodiment.

FIG. 1 is a schematic view of an electrode 10 for a nonaqueous electrolyte secondary battery according to an embodiment. The electrode 10 for a nonaqueous electrolyte secondary battery according to an embodiment includes a current collector 11, and an active material layer 14 including an active material 12 and a binder 13 on the current collector 11 (hereinafter, the reference symbol is omitted unless the drawing is referred to). The binder includes at least a binder material and a fatty acid. The binder binds the current collector and the active material.

The electrode according to this embodiment serves as a positive electrode when an active material for a positive electrode is used as the active material. The electrode according to this embodiment serves as a negative electrode when an active material for a negative electrode is used as the active material. In the case of forming the battery, these electrodes may be used for the both positive and negative electrodes or may be used for one of the positive and negative electrodes of the nonaqueous electrolyte secondary battery.

The positive electrode active material and the negative electrode active material according to this embodiment are different depending on the mode of the battery employing the electrode of this embodiment. A material that can be generally employed as the active material in various batteries can be used as the active material.

In the binder of this embodiment, a fatty acid can be used as the solvent and a polyolefin based polymer can be used as the binder material. The binder is a mixture obtained by dissolving the binder material in a solvent. The binder can have the active material dispersed therein.

As the binder material of this embodiment, an olefin based polymer can be used. Although a modified polyolefin in which a functional group such as a carboxylic group is introduced to a polyolefin skeleton can be used as the olefin based polymer, the embodiment is not limited to this. Alternatively, two or more kinds of binder materials may be mixed.

The fatty acid according to this embodiment is a solvent for dissolving the olefin based polymer, which is difficult to be dissolved into an aqueous or organic solvent. For dissolving the olefin based polymer, the solvent is preferably heated for reducing the dissolving time; therefore, a fatty acid with a boiling point of 100° C. or more is preferable. However, some fatty acids including a linoleic acid and an oleic acid do not vaporize under the atmospheric pressure. The fatty acid that is difficult to vaporize under the atmospheric pressure is not preferable as the fatty acid of this embodiment because drying is difficult. As a result, the fatty acid with a boiling point of 100° C. or more and capable of vaporization under the atmospheric pressure is preferable. In addition to the boiling point, the melting point of the fatty acid also has a preferable range from the viewpoint of workability. The fatty acid with a high melting point solidifies the liquid binder at the time of forming the electrode, which deteriorates the workability. Therefore, the melting point of the fatty acid is preferably 25° C. or less.

As the fatty acid that satisfies the above physical property, a fatty acid whose number of carbon chains including branches is 4 or more and 15 or less is given. The fatty acid includes not just a saturated fatty acid but also an unsaturated fatty acid including a double bond in the skeleton of the carbon chain.

Specifically, as the fatty acid, a butanoic acid, a pentanoic acid, a heptanoic acid, an octanoic acid, a nonanoic acid, a decanoic acid, and an undecanoic acid having a straight chain or a branched chain are given. The carbon chain may be formed with just the saturation bonding, or may have the unsaturated bond in a part. In the above-mentioned fatty acid, when a carbon chain is long, if it has an unsaturated bond, for example to a nonanoic acid, a decanoic acid, and an undecanoic acid, the viscosity becomes low and uniform coating liquid can be formed.

Many fatty acids vaporize in the drying step; however, apart thereof remains in the binder. This remaining fatty acid has an effect of neutralizing alkali, and has an effect of suppressing quality change of the active material due to the electrolytic solution. Moreover, since the fatty acid is difficult to be dissolved into the electrolytic solution, the fatty acid stays in the electrode for a long time without being dissolved into the electrolytic solution. Thus, the cycle characteristic of the battery is improved. However, these fatty acids have a property of repelling the electrolytic solution; therefore, when the remaining amount is too large, the wettability of the electrode due to the electrolytic solution is deteriorated. Accordingly, the amount (wt %) of the remaining fatty acids in the electrode is preferably 1 ppt or more and 1000 ppm or less of the mass of the active material layer.

Since the fatty acid itself has viscosity, the liquid binder does not require the viscosity-adjusting agent. Then, the binder solution with viscosity has excellent dispersion property of a dispersoid; therefore, a dispersing agent, an emulsifier, or the like for dispersing the active material is not necessary.

To the binder, a carbon material such as carbon black, graphite, or acetylene black may be added as a conduction auxiliary agent. In the description on the mass ratio, the mass of the conduction auxiliary agent is included in the mass of the active material layer.

When the active material layer has 100 mass %, the ratio among the positive electrode active material, the conduction auxiliary agent, and the binder is preferably 80 to 95 mass %, 2 to 18 mass %, and 2 to 17 mass %, respectively. When 3 mass % or more of the conduction auxiliary agent is added, the effect of improving the conductivity can be obtained; when 18 mass % or less of the conduction auxiliary agent is added, it is possible to prevent the discharge capacity from being lower than a practical region. When 2 mass % or more of the binder is added, sufficient binding strength can be obtained; when 17 mass % or less of the binder is added, it is possible to prevent the large-current discharge characteristic from being lower than a practical region due to the deterioration in conductivity.

The olefin polymer and fatty acid included in the binder may be identified by separating the entire binder off from the current collector of the electrode and using an infrared-ray spectroscopy (IR), a gas chromatography mass analyzer (Py-GC/MS) in which a pyrolyzer is installed in a sample introduction part, a Raman spectroscopy method, or the like. For measuring the amount of fatty acids in the binder, the separated binder may be analyzed through the gas chromatography.

For the current collector of this embodiment, for example, nickel, iron, stainless steel, titanium, or aluminum which is generally used can be employed.

The positive electrode and the negative electrode can be manufactured while the polyolefin based polymer is used as the binder material, the additive such as a dispersing agent, an emulsifier, or a viscosity-adjusting agent is not required, and further migration is suppressed. Moreover, since the polyolefin based polymer is electrochemically stable, oxidative degradation like SBR and deformation into gel due to dehydrofluorination like PVdF do not occur. Since the fatty acid remains in the electrode, the effect of neutralizing alkali can be obtained, the quality change of the active material due to the electrolytic solution can be suppressed, and the cycle characteristic can be improved.

A manufacturing method for the electrode of this embodiment is described. First, the binder material is pulverized. By being pulverized, the binder material can be dissolved into the fatty acid more easily. Next, the pulverized binder material is put into the fatty acid and dissolved therein. Here, as long as the binder material becomes uniform liquid in the fatty acid, the uniform state may be either the dissolved state or swelled state. Hereinafter, making such a uniform liquid is called dissolution, and swelling is also included in the dissolution. When the dissolution is performed, the temperature may be increased up to the temperature lower than or equal to the boiling point of the fatty acid for reducing the dissolving time.

By using as the liquid binder the solution in which the binder material is dissolved in the fatty acid, the positive electrode active material and the negative electrode active material are mixed at the positive electrode and the negative electrode, respectively. On this occasion, addition as the aforementioned conduction auxiliary agent may be performed. A slurry in which these are mixed is applied to the metal current collector. After the application, the fatty acid is removed by drying at high temperature less than or equal to the boiling point of the fatty acid, thereby fabricating the electrode. The drying is preferably performed by heating and drying in the range of the atmospheric pressure to the reduced pressure.

Figure 2:
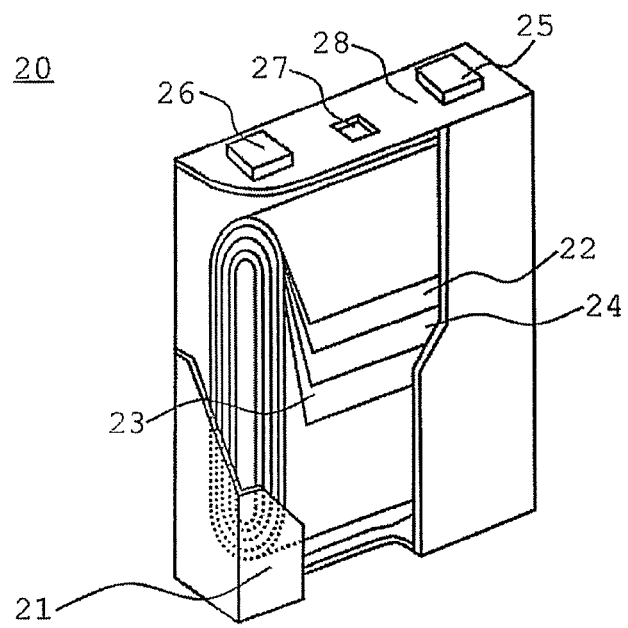
FIG. 2 is a schematic view of a nonaqueous electrolyte secondary battery according to an embodiment.

FIG. 2 is a schematic view of an example of a nonaqueous electrolyte secondary battery including the electrode according to this embodiment. A battery can 21 of this battery 20 has a hollow bottomed cylindrical shape, a hollow bottomed cuboid, or a hollow bottomed cube, with an opening part. The opening part has a cap body 28 for sealing the opening. This cap body 28 is provided with terminals 25 and 26 for extracting current, and the terminals 25 and 26 are connected to a positive electrode 22 and a negative electrode 23 inside through an electrode lead such as an aluminum foil. The positive electrode 22 and the negative electrode 23 are provided with a positive electrode active material layer and a negative electrode active material layer on surfaces of thin metal foils, respectively. Between these electrodes, a separator 24 with ion permeability for insulation is provided, and the electrodes and the separator 24 are wound while they are overlapped, and shaped so as to be housed in the can body 21. Thus, the electrode assembly is formed and housed in the battery can 21 together with the electrolytic solution which is not depicted. The cap body 28 of the opening part of the battery can 21 can be further provided with a gas exhaustion valve 27 for exhausting internal gas in the case of a rise in battery internal pressure.

As the nonaqueous electrolyte secondary battery, a lithium ion secondary battery is given. There is no particular limitation on a negative active material of the lithium ion secondary battery as long as doping and de-doping with a lithium ion can be performed; for example, a lithium alloy, tin oxide, niobium oxide, vanadium oxide, titanium oxide, silicon, silicon oxide, a nitride of a transition metal, a carbon material such as black lead, or a composite including any of these can be used. As the positive electrode active material of the lithium secondary battery, an oxide or a sulfide of a transition metal such as $MoS_2$, $TiS_2$, $MnO_2$, or $V_2O_5$, a composite oxide including lithium and a transition metal such as $LiCoO_2$, $LiMnO_2$, $LiMn_2O_4$, $LiNiO_2$, or $LiNi_xCo_{(1-x)}O_2$ (0<x<1), a conductive polymer material such as polyaniline, polythiophene, polypyrrole, polyacetylene, polyacene, or dimercaptothiazole/polyaniline complex, or the like is given. Above all, the lithium composite oxide including lithium and the transition metal is particularly preferable. In the case where the negative electrode is lithium metal or lithium alloy, a carbon material can be used as the positive electrode. Alternatively, a mixture of the carbon material and the composite oxide of lithium and a transition metal can be used as the positive electrode.

As the nonaqueous electrolyte solution for the lithium ion or the like, for example, the solution in which the electrolyte such as $LiPF_6$, $LiBF_4$, $LiClO_4$, $LiAsF_6$, $CF_3SO_3Li$, or $(CF_3SO_2)N/Li$ is dissolved alone or in combination with another one or more kinds thereof in an organic solvent can be used.

As the separator, a porous film or a polymer electrolyte is used. As the porous film, polyolefin, polyimide, polyvinylidene fluoride, polyester, or the like is given. A porous polyolefin film is particularly preferable because it is stable and does not generate HF; specifically, a porous polyethylene film, a porous polypropylene film, or a multilayer film including a porous polyethylene film and a polypropylene film can be given. Another resin with excellent thermal stability may be applied on the porous polyolefin film.

As an alkali secondary battery, an alkali secondary battery such as a nickel hydrogen secondary battery is given. As the positive electrode active material for the alkali secondary battery, nickel hydroxide, a complex of nickel hydroxide and cobalt or zinc, or the like can be used. As the negative electrode active material for the alkali secondary battery, a hydrogen-absorbing alloy including manganese, nickel, cobalt, aluminum, Mischmetall, or the like is given. As the separator for the alkali secondary battery, the separator similar to that of the lithium ion battery can be used.

As the electrolytic solution for the alkali secondary battery, for example, an aqueous solution in which the electrolyte such as potassium hydroxide or sodium hydroxide is used alone or in combination can be used.

An example is described below in detail.

EXAMPLE

A polyolefin based polymer binder material A (modified polyolefin based polymer with succinic anhydride used as a main skeleton) was added to a heptanoic acid (melting point: −7.5° C., boiling point: 223° C.), and the solution was heated and stirred at 60° C. to 180° C. to dissolve the binder material, thereby fabricating a liquid binder. With the liquid binder, lithium cobaltate (LCO), acetylene black (AB), and graphite were mixed therein with the mass ratio shown in the formula (1), thereby preparing a slurry. After that, the prepared slurry was cast on a 15-μm-thick aluminum foil with an applicator. The space of the applicator was set at 120 μm. Then, drying was performed at 130° C. for removing the solvent of the electrode. After the drying, rolling was performed with a roll press to cut out into a size of 2×2 cm, and vacuum drying was performed for a night at 130° C., thereby providing an electrode.

$$LCO:AB:graphite:binder\ material=100:2.5:2.5:3.5 \quad (1)$$

With the fabricated electrode, a three-electrode type glass cell was fabricated under an Ar gas atmosphere. Lithium foil was used for a reference electrode and a counter electrode. For the separator, a glass filter was used. As the electrolytic solution, a solution in which $LiPF_6$ was dissolved into a solvent in which ethylene carbonate and diethyl carbonate were mixed by 1:2 was used.

Moreover, with the use of a binder material B of polyolefin based polymer (modified polyolefin based polymer with aromatic ketone or aromatic ester used as a main skeleton) or a binder material C thereof (modified polyolefin based polymer with carbonate ester used as a main skeleton), the electrode and the cell were manufactured similarly.

Figure 3:
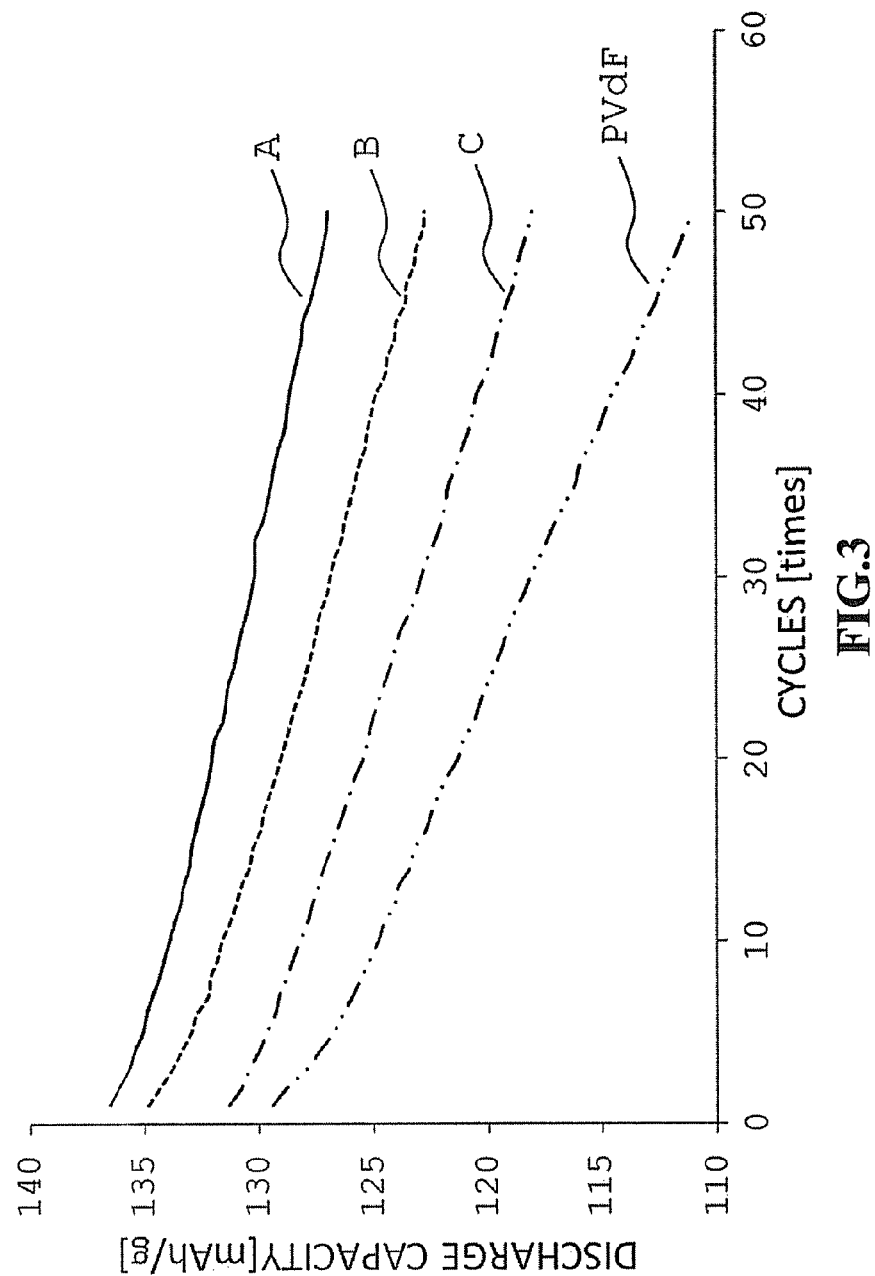
FIG. 3 is a graph representing the cycle characteristics of an example and a comparative example.

The cycle characteristic results (4.35 V vs. NHE) of these cells are shown in FIG. 3. In FIG. 3, the solid line represents the cycle characteristic of the binder material A, the dashed line represents the cycle characteristic of the binder material B, and the dot-dashed line represents the cycle characteristic of the binder material C.

The active material layers of the fabricated electrodes were separated off from the current collectors and analyzed by Py-GC/MS; then, a peak appeared at 130, which corresponds to the molecular amount of heptanoic acid. Thus, it has been confirmed that heptanoic acid is included.

Comparative Example

An electrode and a cell were similarly fabricated with the mass ratio according to the formula (1) using the PVdF NMP dissolved solution as the liquid binder. The cycle characteristic result is also shown in FIG. 3. In FIG. 3, the long dashed double-dotted line represents the cycle characteristic of PVdF.

It has been confirmed from FIG. 3 that the deterioration speed of the cycle characteristic of the electrode is lower than that of the comparative example. It is considered that this is because the binder of the polyolefin based polymer is electrochemically stable owing to being free from dehydrofluorination like PVdF and the deterioration of the electrode is suppressed. It is considered that, moreover, since the fatty acid stays in the electrode, an effect of suppressing the quality change of the active material due to the electrolytic solution can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode for a nonaqueous electrolyte secondary battery, comprising:
   a current collector; and
   an active material layer including an active material and a binder, formed on the current collector, wherein
   the binder includes at least an olefin based polymer and a fatty acid as separate materials,
   the fatty acid has a melting point of 25° C. or less and a boiling point of 100° C. or more,
   a carbon chain of the fatty acid has 4 or more and 9 or less carbon atoms, and
     the fatty acid includes at least one of a butanoic acid, a pentanoic acid, a heptanoic acid, an octanoic acid and a nonanoic acid having a straight chain or a branched chain structure.

2. The electrode according to claim 1, wherein the fatty acid includes at least one of a saturated fatty acid and an unsaturated fatty acid.

3. The electrode according to claim 1, wherein a mass of the fatty acid is 1 ppt or more and 1000 ppm or less of a mass of the active material layer.

4. A nonaqueous electrolyte secondary battery using an electrode for a nonaqueous electrolyte secondary battery comprising:
   a current collector; and
   an active material layer including an active material and a binder, formed on the current collector, wherein
   the binder includes at least an olefin based polymer and a fatty acid as separate materials,
   the fatty acid has a melting point of 25° C. or less and a boiling point of 100° C. or more,
   a carbon chain of the fatty acid has 4 or more and 9 or less carbon atoms, and
   the fatty acid includes at least one of a butanoic acid, a pentanoic acid, a heptanoic acid, an octanoic acid and a nonanoic acid having a straight chain or a branched chain structure.

5. The battery according to claim 4, wherein the fatty acid includes at least one of a saturated fatty acid and an unsaturated fatty acid.

6. The battery according to claim 4, wherein a mass of the fatty acid is 1 ppt or more and 1000 ppm or less of a mass of the active material layer.

7. A binder for an electrode, comprising:
   an olefin based polymer; and
   a fatty acid including at least one of a butanoic acid, a pentanoic acid, a heptanoic acid, an octanoic acid and a nonanoic acid having a straight chain or a branched chain structure, wherein
   the fatty acid has a melting point of 25° C. or less and a boiling point of 100° C. or more;
   the olefin based polymer and fatty acid being separate materials,
   a carbon chain of the fatty acid has 4 or more and 9 or less carbon atoms, and
   the olefin based polymer is selected from a modified polyolefin based polymer with succinic anhydride, aromatic ketone, aromatic ester or carbonate ester used as a main skeleton.

8. The binder according to claim 7, wherein the fatty acid includes at least one of a saturated fatty acid and an unsaturated fatty acid.

9. The electrode according to claim 1, wherein the olefin based polymer is a modified polymer in which a functional group is introduced to a polyolefin skeleton.

10. The electrode according to claim 1, wherein the olefin based polymer is selected from a modified polyolefin based polymer with succinic anhydride, aromatic ketone, aromatic ester or carbonate ester used as a main skeleton.

11. The battery according to claim 4, wherein the olefin based polymer is a modified polymer in which a functional group is introduced to a polyolefin skeleton.

12. The battery according to claim 4, wherein the olefin based polymer is selected from a modified polyolefin based polymer with succinic anhydride, aromatic ketone, aromatic ester or carbonate ester used as a main skeleton.

13. The binder according to claim 7, wherein the olefin based polymer is a modified polymer in which a functional group is introduced to a polyolefin skeleton.

* * * * *